US012694858B2

(12) United States Patent
Meslioui

(10) Patent No.: US 12,694,858 B2
(45) Date of Patent: Jul. 28, 2026

(54) ACOUSTIC PANEL WITH NON-LINEAR VARIABLE PERCENTAGE OF OPEN AREA

(71) Applicant: Pratt & Whitney Canada Corp., Longueuil (CA)

(72) Inventor: Sid-Ali Meslioui, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 200 days.

(21) Appl. No.: 18/129,632

(22) Filed: Mar. 31, 2023

(65) Prior Publication Data

US 2024/0331674 A1 Oct. 3, 2024

(51) Int. Cl.
*G10K 11/16* (2006.01)

(52) U.S. Cl.
CPC .................................... *G10K 11/16* (2013.01)

(58) Field of Classification Search
CPC . F02C 7/045; F02C 7/24; F02K 1/827; G10K 11/172; F05D 2260/96; F05D 2250/283; B32B 3/12; B32B 3/266; B64D 2033/0206
See application file for complete search history.

(56) References Cited

U.S. PATENT DOCUMENTS

| | | | | |
|---|---|---|---|---|
| 4,291,080 | A | 9/1981 | Ely | |
| 4,327,816 | A | 5/1982 | Bennett | |
| 6,358,590 | B1 | 3/2002 | Blair | |
| 6,609,592 | B2 | 8/2003 | Wilson | |
| 6,827,180 | B2 * | 12/2004 | Wilson | B23K 26/389 181/292 |
| 7,540,354 | B2 | 6/2009 | Morin | |
| 7,946,385 | B2 * | 5/2011 | Lalane | G10K 11/172 181/290 |
| 7,963,362 | B2 | 6/2011 | Lidoine | |
| 9,447,576 | B2 * | 9/2016 | Liou | B32B 15/20 |
| 10,066,548 | B2 | 9/2018 | Gilson | |
| 11,131,456 | B2 | 9/2021 | Dyszkiewicz | |
| 11,359,577 | B2 * | 6/2022 | Kruckenberg | F02C 7/24 |
| 11,434,819 | B2 * | 9/2022 | Murugappan | F04D 29/664 |

(Continued)

FOREIGN PATENT DOCUMENTS

| | | |
|---|---|---|
| CN | 101149296 B | 9/2011 |
| CN | 111706433 B | 2/2022 |

(Continued)

OTHER PUBLICATIONS

EP Search Report for EP Patent Application No. 24167740.0 dated Nov. 22, 2024.

*Primary Examiner* — Jeremy A Luks
(74) *Attorney, Agent, or Firm* — Getz Balich LLC

(57) ABSTRACT

An acoustic panel is provided that includes a first skin, a second skin and a cellular core. The first skin includes a plurality of perforations. The perforations are configured to provide the first skin with a percentage of open area that changes according to a non-linear function as the first skin extends in a first direction. Sizes of at least some of the perforations vary as the first skin extends in the first direction. The cellular core is arranged between and is connected to the first skin and the second skin. The cellular core includes a plurality of chambers. Each of the chambers extends between the first skin and the second skin. Each of the chambers is fluidly coupled with a respective one or more of the perforations.

17 Claims, 10 Drawing Sheets

(56) References Cited

U.S. PATENT DOCUMENTS

| | | | | |
|---|---|---|---|---|
| 12,109,793 | B2 * | 10/2024 | Holland | B24C 1/045 |
| 12,116,932 | B2 * | 10/2024 | Pastouchenko | F01D 25/04 |
| 2006/0169532 | A1 | 8/2006 | Patrick | |
| 2007/0209366 | A1 * | 9/2007 | Gerendas | F23R 3/06 60/757 |
| 2009/0014234 | A1 * | 1/2009 | Bagnall | G10K 11/172 181/214 |
| 2020/0392898 | A1 | 12/2020 | Sid-Ali | |
| 2023/0279578 | A1 * | 9/2023 | Kestler | B64C 1/40 205/122 |

FOREIGN PATENT DOCUMENTS

| | | | |
|---|---|---|---|
| DE | 3913347 | A1 | 10/1990 |
| EP | 1701016 | B1 | 6/2012 |
| GB | 2515028 | A | 12/2014 |

* cited by examiner

ACOUSTIC PANEL WITH NON-LINEAR VARIABLE PERCENTAGE OF OPEN AREA

TECHNICAL FIELD

This disclosure relates generally to an acoustic panel for, for example, an aircraft propulsion system.

BACKGROUND INFORMATION

An aircraft propulsion system may include one or more acoustic panels for attenuating sound generated by its gas turbine engine. Various types and configurations of acoustic panels are known in the art. While these known acoustic panels have various benefits, there is still room in the art for improvement.

SUMMARY

According to an aspect of the present disclosure, an acoustic panel is provided that includes a first skin, a second skin and a cellular core. The first skin includes a plurality of perforations. The perforations are configured to provide the first skin with a percentage of open area that changes according to a non-linear function as the first skin extends in a first direction. Sizes of at least some of the perforations vary as the first skin extends in the first direction. The cellular core is arranged between and is connected to the first skin and the second skin. The cellular core includes a plurality of chambers. Each of the chambers extends between the first skin and the second skin. Each of the chambers is fluidly coupled with a respective one or more of the perforations.

According to another aspect of the present disclosure, another acoustic panel is provided that includes a first skin, a second skin and a cellular core. The first skin includes a plurality of perforations arranged in an array. Widths of the perforations decrease according to a non-linear function as the array extends in the first direction. The cellular core is arranged between and is connected to the first skin and the second skin. The cellular core includes a plurality of chambers. Each of the chambers extends between the first skin and the second skin. Each of the chambers is fluidly coupled with a respective one or more of the perforations.

According to still another aspect of the present disclosure, another acoustic panel is provided that includes a first skin, a second skin and a cellular core. The first skin includes a plurality of perforations. The perforations are configured to provide the first skin with a percentage of open area that varies according to a non-linear function as the first skin extends in a first direction. Spacing between the perforations is uniform along the first direction. The cellular core is arranged between and is connected to the first skin and the second skin. The cellular core includes a plurality of chambers. Each of the chambers extends between the first skin and the second skin. Each of the chambers is fluidly coupled with a respective one or more of the perforations.

The perforations may be arranged in an array. Widths of the perforations may continuously vary according to a non-linear function as the array extends in the first direction.

The first skin may extend axially along and circumferentially about an axis. The first direction may be an axial direction along the axis.

The at least some of the perforations may be arranged in an array. The sizes of the at least some of the perforations may change according to the non-linear function as the array extends in the first direction.

Inter-perforation distances between respective neighboring pairs of the at least some of the perforations may be uniform.

The non-linear function may be a logarithmic function.

The non-linear function may be a parabolic function.

The non-linear function may be a power function.

The non-linear function may be an exponential function.

The percentage of open area may continuously change according to the non-linear function as the first skin extends in the first direction.

The first skin may extend axially along and circumferentially about an axis. The first direction may include a component along the axis.

The first direction may be a direction of airflow along the first skin during operation of the acoustic panel. The percentage of open area may decrease as the first skin extends in the first direction.

A first of the perforations may have a circular geometry.

A first of the perforations may have a non-circular geometry.

A first of the perforations may extend along a centerline through the first skin from a first side of the first skin to a second side of the first skin. The centerline may be perpendicular to the first side of the first skin.

A first of the perforations may extend along a centerline through the first skin from a first side of the first skin to a second side of the first skin. The centerline may be angularly offset from the first side of the first skin by an acute angle.

The perforations may extend along respective centerlines through the first skin from a first side of the first skin to a second side of the first skin. Respective angles between the centerlines and the first side of the first skin may change as the first skin extends in the first direction.

A first of the chambers may extend un-interrupted through the cellular core from the second skin to the first skin.

The cellular core may include a septum dividing a first of the chambers into a plurality of fluidly coupled sub-chambers.

At least the first skin, the second skin and the cellular core may form a component of an aircraft propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
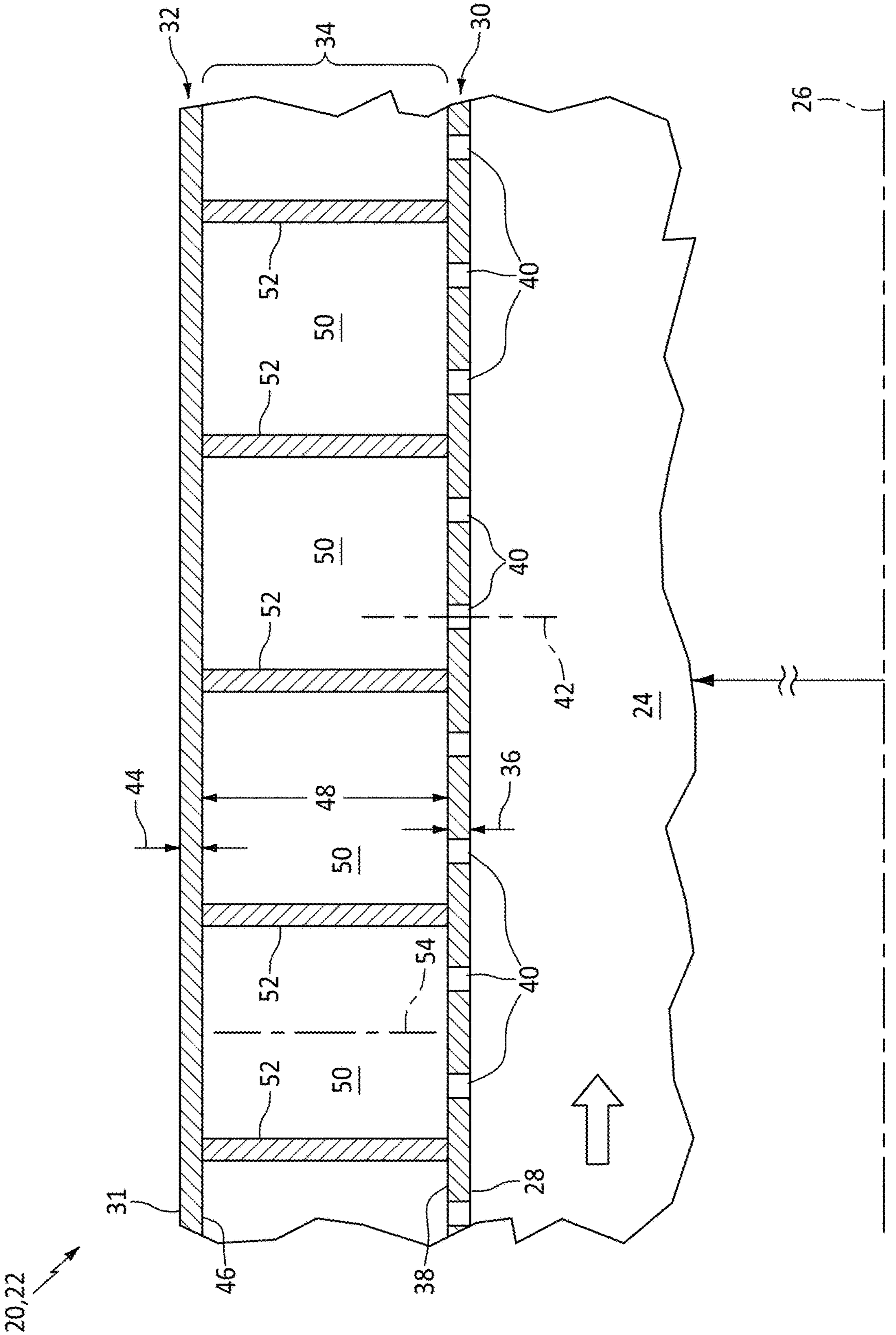
FIG. 1 is a partial side sectional illustration of an acoustic panel.
Figure 2:
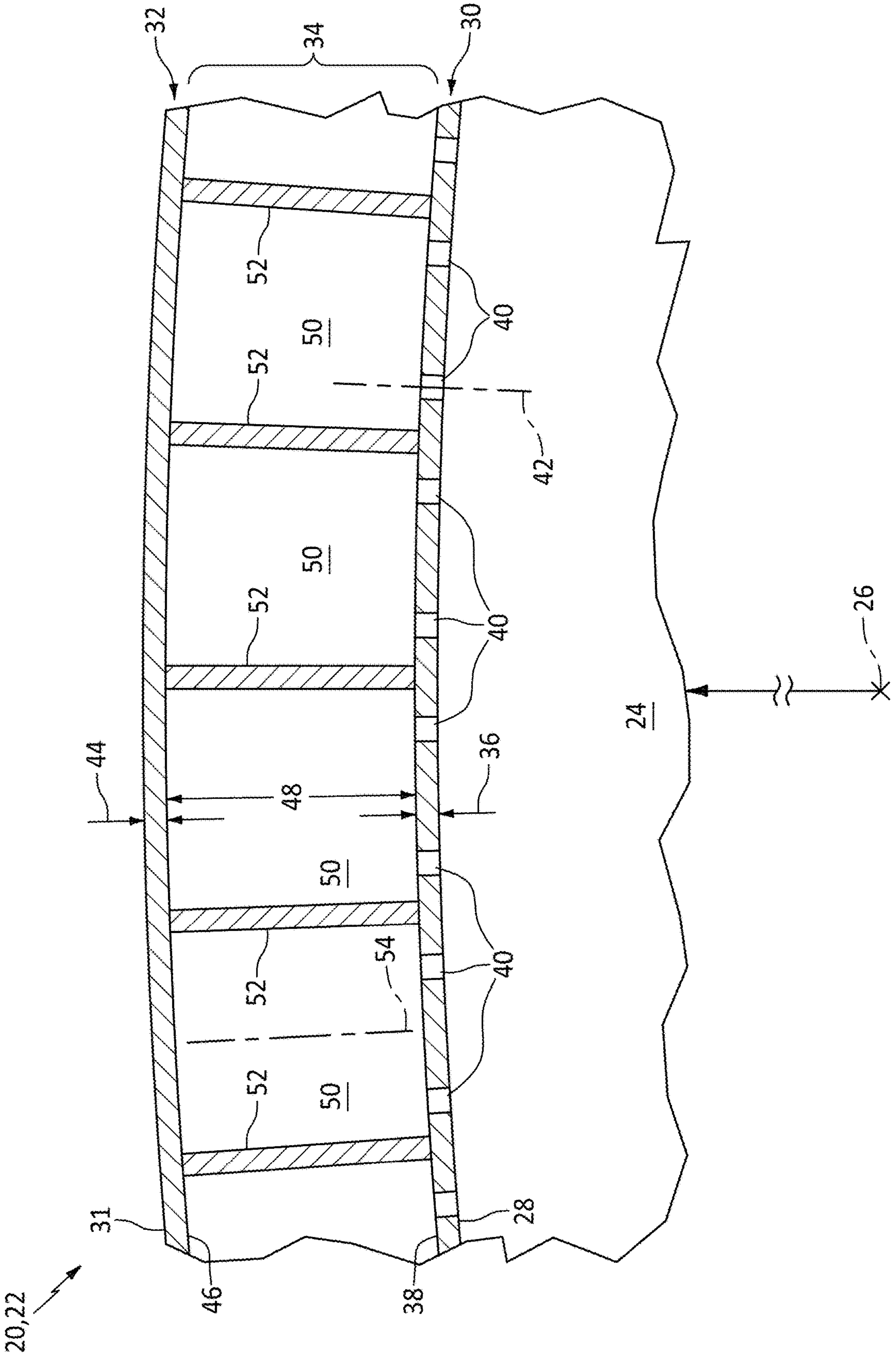
FIG. 2 is a partial cross-sectional illustration of the acoustic panel.

FIGS. 1 and 2 are partial sectional illustrations of a structural, acoustic panel 20 for an aircraft. This acoustic panel 20 may be configured to attenuate sound (e.g., noise) generated by a propulsion system of the aircraft. The aircraft propulsion system may be a turbofan propulsion system, a turbojet propulsion system, a turboprop propulsion system or any other ducted-rotor or open-rotor aircraft propulsion system. The acoustic panel 20 may be part of a housing (e.g., a nacelle) for an engine (e.g., a gas turbine engine) of the aircraft propulsion system. The acoustic panel 20, for example, may be configured as or otherwise included as part of an inner barrel, an outer barrel, a translating sleeve, a blocker door, a bifurcation, etc. Alternatively, the acoustic panel 20 may be part of another component of the aircraft such as, but not limited to, an engine pylon, an aircraft wing or an aircraft fuselage. Furthermore, the acoustic panel 20 may also or alternatively be configured to attenuate aircraft related sound other than the sound generated by the aircraft propulsion system. However, for ease of description, the acoustic panel 20 may be described below as attenuating propulsion system sound and with respect to a component 22 (e.g., barrel) of the engine housing along a flowpath 24 (e.g., a bypass flowpath) within the aircraft propulsion system.

Referring to FIG. 1, the acoustic panel 20 extends axially along a centerline axis 26. Briefly, this centerline axis 26 may be a centerline axis of the aircraft propulsion system, a centerline axis of the engine housing and/or a centerline axis of the component 22 (e.g., the barrel) which is formed by or otherwise includes the acoustic panel 20. The acoustic panel 20 extends radially between and to a radial inner side 28 of the acoustic panel 20 and a radial outer side 30 of the acoustic panel 20. Referring to FIG. 2, the acoustic panel 20 extends circumferentially about (e.g., partially or completely around) the centerline axis 26. The component 22 and/or its acoustic panel 20 may thereby have a curved (e.g., arcuate, cylindrical, conical, frustoconical) geometry. The present disclosure, however, is not limited to such an exemplary curved geometry.

The acoustic panel 20 of FIGS. 1 and 2 includes a perforated face skin 30, a solid (e.g., non-perforated) back skin 32 and a cellular core 34. For ease of description, the face skin 30 is described below as an inner skin of the acoustic panel 20 and the back skin 32 is described below as an outer skin of the acoustic panel 20. With such an arrangement, the acoustic panel 20 and its face skin 30 may form an outer peripheral boundary of at least a portion of the flowpath 24 within the aircraft propulsion system. It is contemplated, however, the face skin 30 may alternatively be the acoustic panel outer skin and the back skin 32 may alternatively be the acoustic panel inner skin. With such an arrangement, the acoustic panel 20 and its face skin 30 may form an inner peripheral boundary of at least a portion of the flowpath 24 within the aircraft propulsion system. The present disclosure, of course, is not limited to the foregoing exemplary arrangements. The acoustic panel 20, for example, may form a circumferential side boundary of the flowpath 24 and/or may otherwise be located with the aircraft propulsion system and/or the aircraft.

The face skin 30 of FIGS. 1 and 2 is a relatively thin sheet or layer of material that extends axially along and circumferentially about the centerline axis 26. This face skin material may be or otherwise include a metal, a polymer (e.g., a thermoplastic or thermoset material) or a fiber reinforced composite (e.g., fiber reinforcement such as fiberglass, carbon fiber and/or aramid fibers within a polymer matrix). The face skin 30 has a radial thickness 36. This face skin thickness 36 extends radially between opposing sides 28 and 38 of the face skin 30, where the exterior side 28 of the face skin 30 is also the inner side of the acoustic panel 20 of FIGS. 1 and 2. The face skin thickness 36 may remain uniform (e.g., constant) as the face skin 30 extends axially along and/or circumferentially about the centerline axis 26. The face skin 30 includes a plurality of perforations 40; e.g., apertures such as through-holes. Each of these face skin perforations 40 extends generally radially through the face skin 30 along a centerline 42 of the respective face skin perforation 40 between the face skin sides 28 and 38.

The back skin 32 of FIGS. 1 and 2 is a relatively thin sheet or layer of (e.g., continuous and uninterrupted) material that extends axially along and circumferentially about the centerline axis 26. This back skin material may be the same as or different than the face skin material. The back skin material, for example, may be or otherwise include a metal, a polymer (e.g., a thermoplastic or thermoset material) or a fiber reinforced composite (e.g., fiber reinforcement such as fiberglass, carbon fiber and/or aramid fibers within a polymer matrix). The back skin 32 has a radial thickness 44. This back skin thickness 44 extends radially between opposing sides 30 and 46 of the back skin 32, where the exterior side 30 of the back skin 32 is also the outer side of the acoustic panel 20 of FIGS. 1 and 2. The back skin thickness 44 may remain uniform (e.g., constant) as the back skin 32 extends axially along and/or circumferentially about the centerline axis 26. The back skin thickness 44 may be equal to or different (e.g., greater or less) than the face skin thickness 36.

The cellular core 34 is arranged and extends radially between the face skin 30 and the back skin 32. The cellular core 34 may also be connected to the face skin 30 and/or the back skin 32. The cellular core 34, for example, may be welded, brazed, fused, adhered and/or otherwise bonded to the face skin 30 and/or the back skin 32. The cellular core 34 of FIGS. 1 and 2 extends axially along and circumferentially about the centerline axis 26. The cellular core 34 has a radial depth 48. This cellular core depth 48 extends radially between and to the face skin 30 at its interior side 38 and the back skin 32 at its interior side 46. The cellular core depth 48 may remain uniform (e.g., constant) as the cellular core 34 extends axially along and/or circumferentially about the centerline axis 26. The cellular core depth 48 may be substantially larger than the face skin thickness 36 and/or the back skin thickness 44. The cellular core depth 48, for example, may be at least ten to forty times (10-40×), or more, larger than the face skin thickness 36 and/or the back skin thickness 44. The cellular core 34 of the present disclosure, however, is not limited to such an exemplary dimensional relationship and may vary based on sound attenuation requirements, space requirements, etc.

Figure 3:
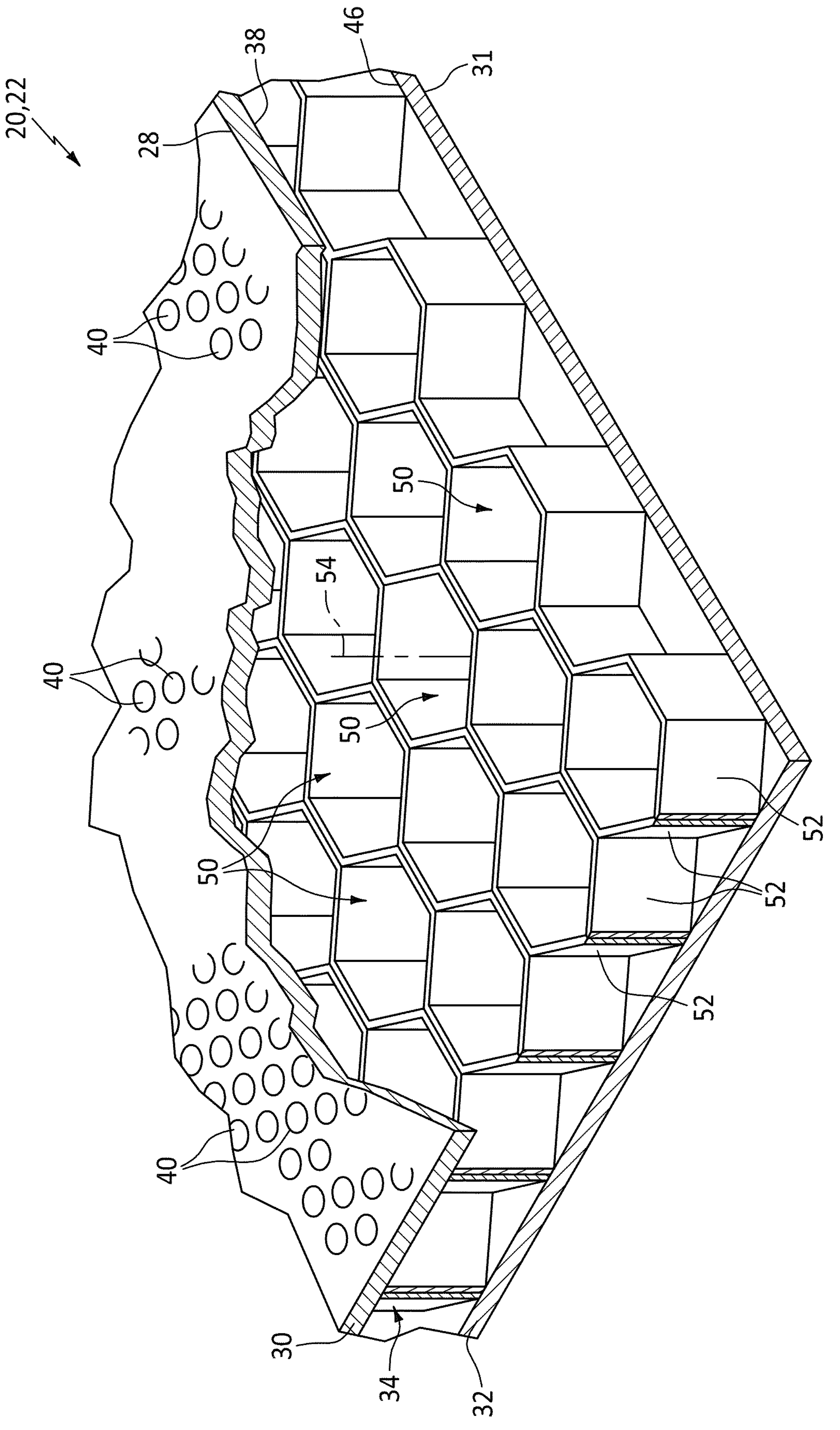
FIG. 3 is a partial perspective cutaway illustration of the acoustic panel.

The cellular core 34 of FIGS. 1 and 2 is configured with one or more core chambers 50 (e.g., internal chambers, acoustic resonance chambers, internal cavities, etc.) radially between the face skin 30 and the back skin 32. Referring to FIG. 3, the cellular core 34 may be configured as a honeycomb core. The cellular core 34 of FIG. 3, for example, includes a plurality of corrugated sidewalls 52. These corrugated sidewalls 52 are arranged in a side-by-side array and are connected to one another such that each neighboring (e.g., adjacent) pair of the corrugated sidewalls 52 forms an array of the core chambers 50 laterally (e.g., circumferentially or axially) therebetween. The cellular core 34 and its corrugated sidewalls 52 may be constructed from or otherwise include a core material such as metal; e.g., sheet metal. The present disclosure, however, is not limited to such an exemplary cellular core construction nor material.

Each core chamber 50 of FIGS. 1 and 2 extends radially within/through the cellular core 34 along a respective centerline 54 of the respective core chamber 50 between and to the face skin 30 at its interior side 38 and the back skin 32 at its interior side 46. One or more or all of the core chambers 50 may thereby each overlap and be fluidly coupled with a respective set of one or more of the face skin perforations 40. Referring to FIG. 3, each of the core chambers 50 has a cross-sectional geometry (e.g., shape, size, etc.) when viewed in a reference plane; e.g., a plane perpendicular to the chamber centerline 54 of the respective core chamber 50. This chamber cross-sectional geometry may have a polygonal shape; e.g., a hexagonal shape, a rectangular shape, a triangular shape, etc. The present disclosure, however, is not limited to foregoing exemplary cellular core configuration. For example, one or more or all of the core chambers 50 may alternatively each have a circular, elliptical or other non-polygonal cross-sectional geometry. Furthermore, various other types of honeycomb cores and, more generally, various other types of cellular cores for an acoustic panel are known in the art, and the present disclosure is not limited to any particular ones thereof.

The acoustic panel 20 of FIGS. 1 and 2 is configured as a single-degree of freedom (SDOF) acoustic panel. One or more or all of the core chambers 50 of FIGS. 1 and 2, for example, each extends radially uninterrupted between and to the face skin 30 and the back skin 32. With such an arrangement, the acoustic panel 20 may be tuned to attenuate, for example, a select frequency of sound, which tuning may be based on a radial height of each core chamber 50/the cellular core depth 48.

During operation of the acoustic panel 20 of FIGS. 1 and 2, sound waves may enter a core chamber 50 through the respective face skin perforation(s) 40. These sound waves may travel through the core chamber 50 and reflect against the back skin 32. The reflected sound waves may travel back through the core chamber 50 and exit the acoustic panel 20 through the respective face skin perforation(s) 40, where those reflected sound waves may be out of phase from and destructively interfere with incoming soundwaves; i.e., pressure waves. Of course, the sound waves may also or alternatively reflect against one or more other elements of the acoustic panel 20 which may further influence sound attenuation. Moreover, sound attenuation may be influenced by frictional losses in the perforations 40 (e.g., when pressure waves move in and out of the perforations 40 as the chambers 50 are energized and the acoustic panel 20 operates about its resonance frequency(ies)) thus converting the mechanical energy into heat dissipation.

While the acoustic panel 20 of FIGS. 1 and 2 is configured as a single-degree of freedom acoustic panel, the present disclosure is not limited to such an exemplary configuration. For example, referring to FIG. 4, the acoustic panel 20 may alternatively be configured as a multi-degree of freedom (MDOF) acoustic panel such as, but not limited to, a double-degree of freedom (DDOF) acoustic panel. One or more or all of the core chambers 50 of FIG. 4, for example, is provided with at least (or only) one respective septum 56; e.g., a perforated and/or porous member. Each septum 56 extends laterally across the respective core chamber 50 to divide that core chamber 50 into a plurality of sub-chambers 58A and 58B. These sub-chambers 58A and 58B are fluidly coupled with one another (e.g., radially) across the respective septum 56 through one or more perforations 60 (or pores) in that septum 56. With such an arrangement, the acoustic panel 20 may be tuned to attenuate multiple frequencies of sound, which tuning may be based on the radial height of each core chamber 50/the cellular core depth 48 as well as a radial distance between each septum 56 and the face skin 30.

Figure 4:
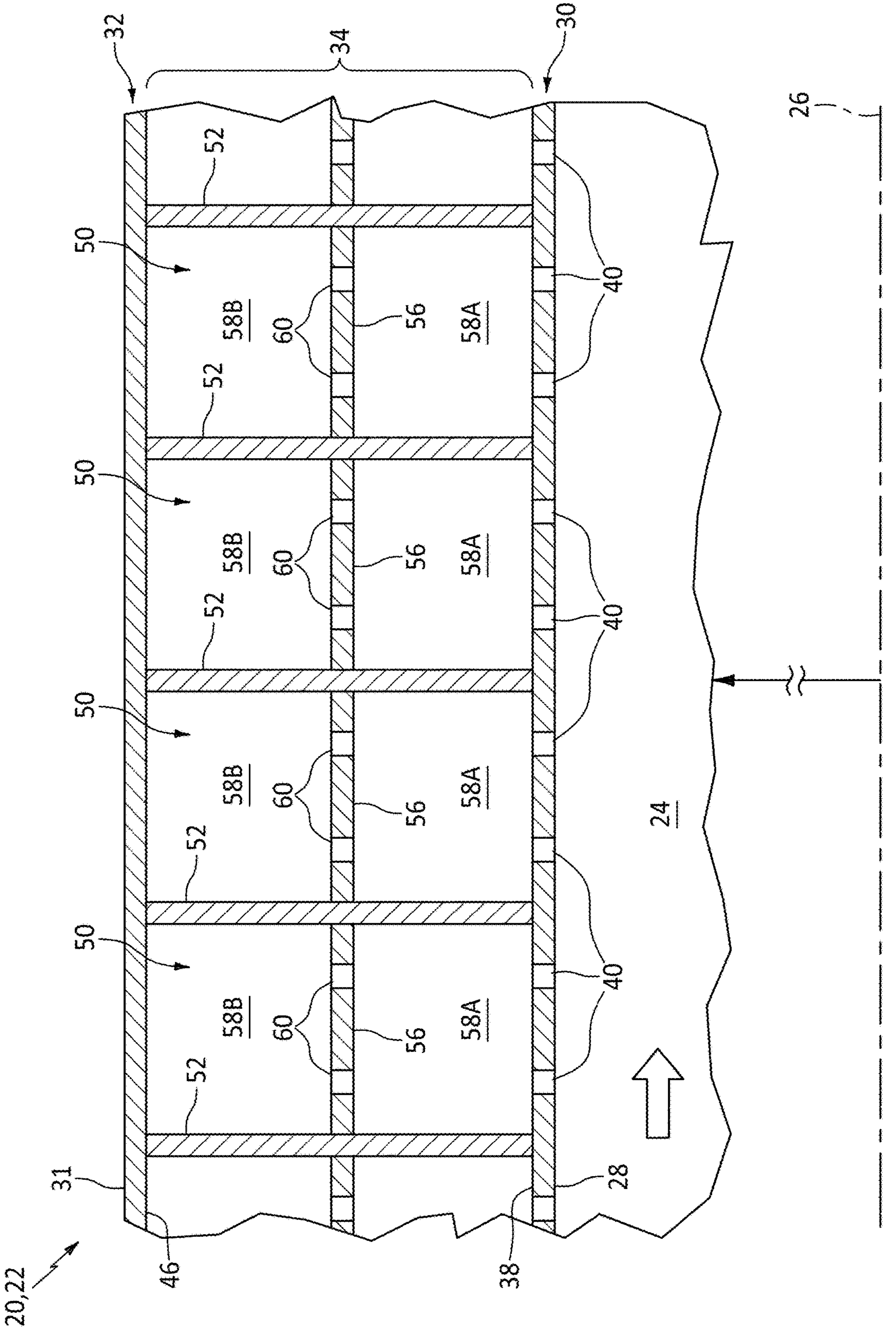
FIG. 4 is a partial side sectional illustration of the acoustic panel configured as a multi-degree of freedom acoustic panel.

During operation of the acoustic panel 20 of FIG. 4, sound waves may enter a core chamber 50 through the respective face skin perforation(s) 40. Some of these sound waves may travel through the near sub-chamber 58A and reflect against solid portion(s) of the septum 56. The reflected sound waves may travel back through the near sub-chamber 58A and exit the acoustic panel 20 through the respective face skin perforation(s) 40, where those reflected sound waves may be out of phase from and destructively interfere with incoming soundwaves of a first frequency. Other sound waves may pass through porous portion(s) of the septum 56 and travel through the far sub-chamber 58B and reflect against the back skin 32. The reflected sound waves may travel back through the far sub-chamber 58B, across the septum 56, through the near sub-chamber 58A and exit the acoustic panel 20 through the respective face skin perforation(s) 40, where those reflected sound waves may be out of phase from and destructively interfere with other incoming soundwaves of a second frequency. Of course, the sound waves may also or alternatively reflect against one or more other elements of the acoustic panel 20 which may further influence sound attenuation.

Figure 5:
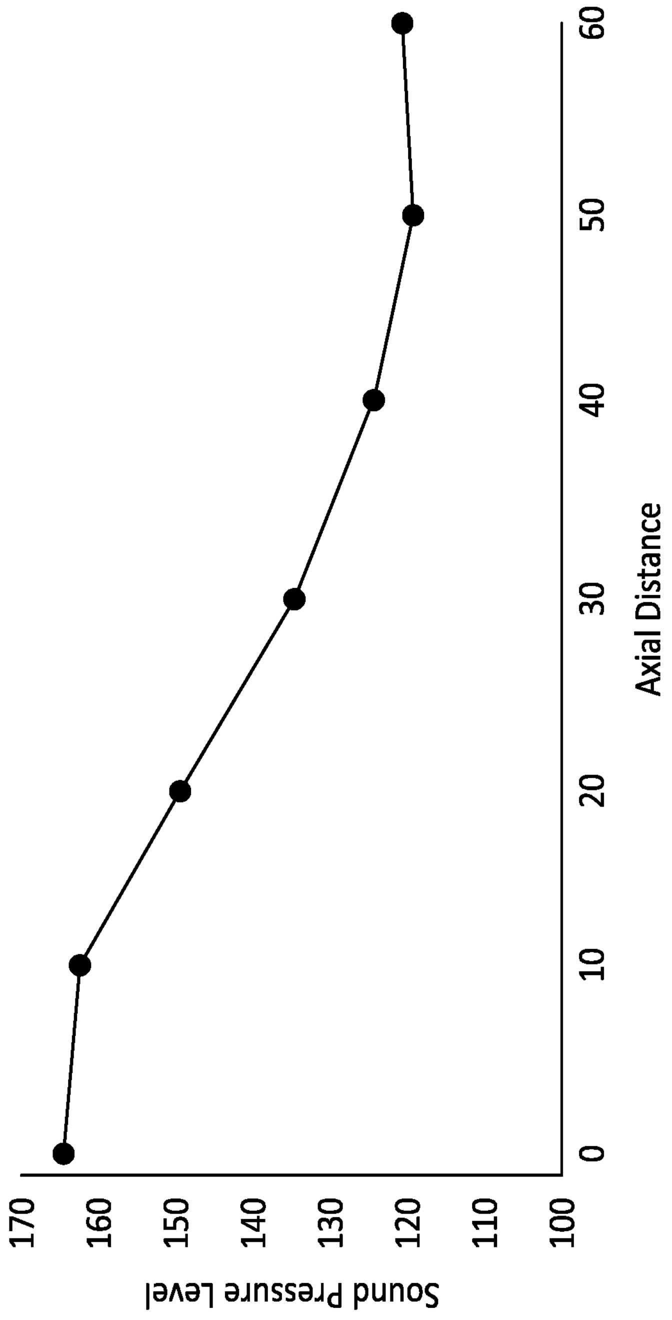
FIG. 5 is a graph depicting axial distance along an acoustic panel versus sound pressure level of acoustic waves traveling along the acoustic panel.
Figure 6:
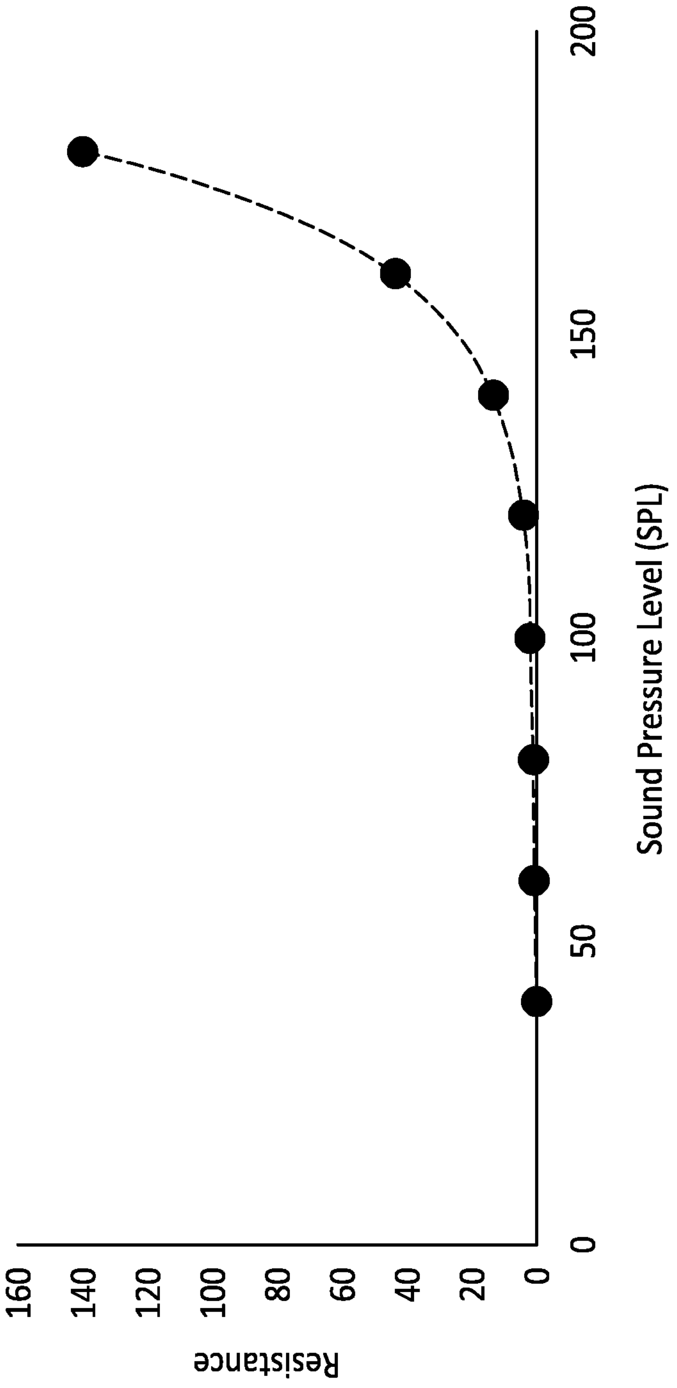
FIG. 6 is a graph depicting sound pressure level of acoustic waves versus resistance.

FIGS. 5 and 6 graphically illustrate parameters of sound waves traveling through a flowpath. FIG. 5 illustrates that a sound pressure level (SPL) of the sound waves may continuously and/or non-uniformly decrease as a distance traveled in a downstream direction (e.g., see longitudinal direction 62 shown in FIG. 7) along the acoustic panel 20 increases. Acoustic panel attenuation needs (e.g., specification requirements) may thereby decrease as the distance along the acoustic panel 20 in the downstream direction increases. Here, the term "downstream" may describe a relationship relative to a sound source; e.g., a fan rotor or the like. For example, a location is downstream from the sound source where that location is spaced from the sound source and receives sound waves from the sound source. However, the term "downstream" may also describe a relationship relative to a flow of fluid (e.g., through the flowpath 24) where the acoustic panel is fluidly downstream of the sound source. Of course, it is contemplated the acoustic panel may alternatively be arranged fluidly upstream of the sound source in other embodiments; e.g., in an inlet duct. FIG. 6 illustrates a relationship between the sound pressure level of the sound waves and a flow resistance (R). As shown, the flow resistance non-linearly (e.g., exponentially) increases as the sound pressure level of the sound waves increase. Generally speaking, the higher the flow resistance, the less permeable a fluid such as air is through a porous material such as the face skin 30. Thus, optimum acoustic panel characteristics like acoustic flow resistance depend on the sound pressure level. Acoustic properties or characteristics of the acoustic panel 20 may therefore be changed (e.g., adapted, adjusted) to effectively respond to and attenuate a lower or higher sound pressure level. Moreover, since the sound pressure level decreases as a distance (x) along the acoustic panel 20 extends in the downstream direction increases, an optimum complex acoustic impendence (Z) value may be maintained by increasing the acoustic resistance (R) (a mathematical part of Z), where Z=R+i X and where i is an impedance of the acoustic panel 20 and its face skin 30 and where X is an acoustic reactance (a mathematical imaginary part of Z).

Figure 7:
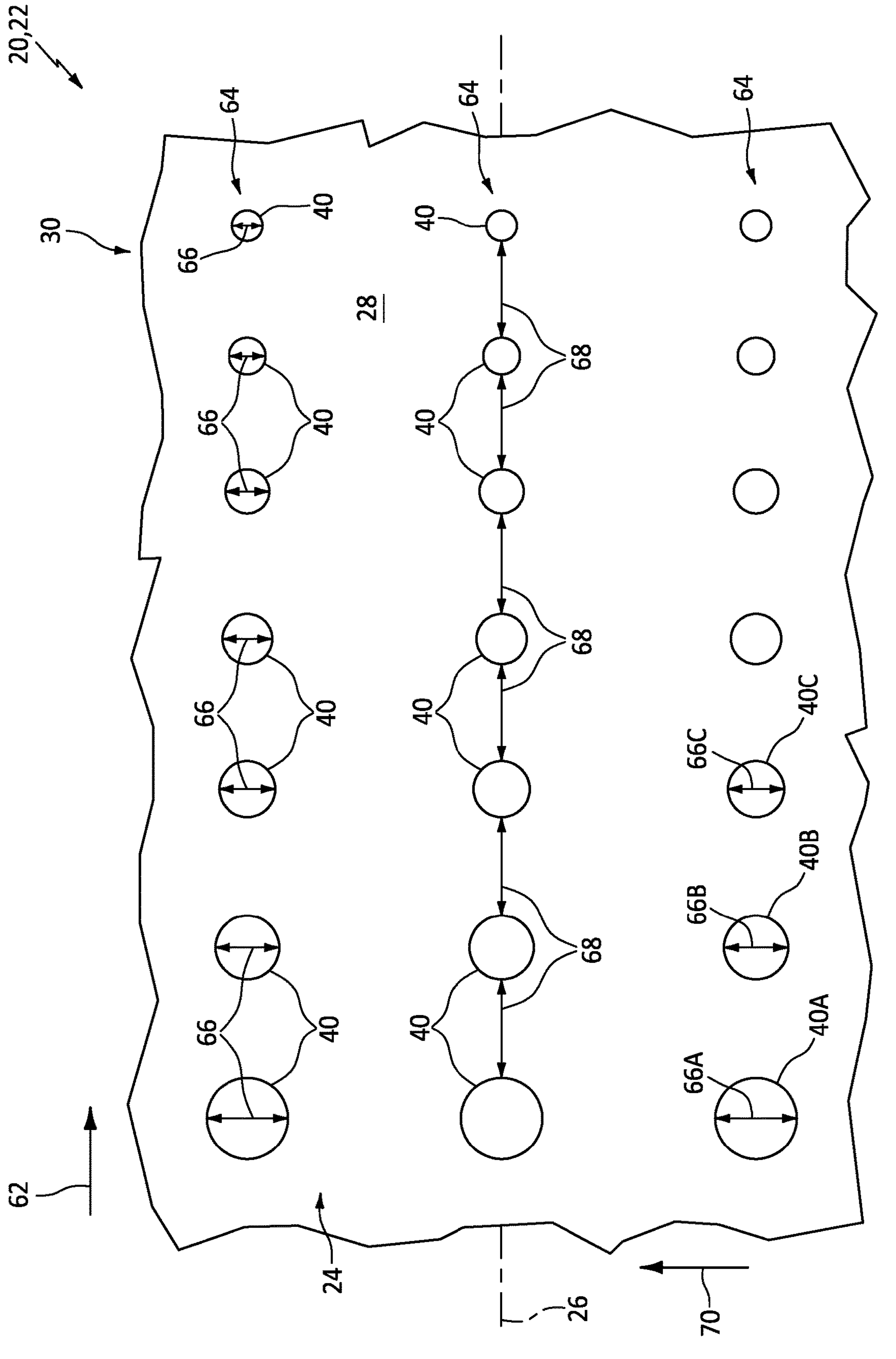
FIG. 7 is an illustration of a portion of a face skin with a variable percentage of open area.

Parameters associated with the face skin perforations 40 may affect the capability of the acoustic panel 20 to attenuate sound as well as aerodynamic characteristics of the acoustic panel 20. For example, the acoustic panel 20 and, more particularly, the face skin 30 of FIG. 7 has a percentage of open area (POA). The term "percentage of open area" may describe a percentage of a surface area of an element (here, an exterior surface of the face skin 30 at its exterior side 28) that is occupied by open area; e.g., voids from the face skin perforations 40. As the percentage of open area of the face skin 30 increases, the face skin 30 becomes more permeable to a flow of fluid such as air. Conversely, as the percentage of open area of the face skin 30 decreases, the face skin 30 becomes less permeable to the flow of fluid. Therefore, at locations where the sound waves have a higher sound pressure level and, thus, a higher flow resistance, it is important (e.g., for maximum noise benefit) to provide the face skin 30 with a higher percentage of open area. However, at locations where the sound waves have a lower sound pressure level and, thus, a lower flow resistance, the face skin 30 may be provided with a lower percentage of open area. Furthermore, reducing the percentage of open area may also reduce aerodynamic drag along the face skin 30, which may in turn increase aircraft propulsion system efficiency. The percentage of open area of the face skin 30 may therefore advantageously be tailored to balance providing fluid permeability while reducing (e.g., minimizing) aerodynamic drag. With the foregoing in mind, the percentage of open area of the face skin 30 of FIG. 7 is configured to decrease as the acoustic panel 20 and its face skin 30 extend longitudinally along the acoustic panel 20 and its face skin 30 in the longitudinal direction 62. This decrease in the percentage of open area reduces aerodynamic drag of the acoustic panel 20 while still providing enough face skin permeability to facilitate acoustic attenuation.

The decrease in the percentage of open area may be tailored to match and/or approximately follow one or more parameters of the soundwaves as those parameter(s) change longitudinally along the acoustic panel 20 and its face skin 30. The soundwave parameter(s) may include, but are not limited to, the sound pressure level(s), and/or the sound propagation characteristic(s) of the soundwaves (e.g., which are influenced by airflow through the duct) and the flow resistance (e.g., which, in general, defines an amount of sound absorption and attenuation, and which may be optimized). The percentage of open area of the face skin 30, for example, may continuously and/or non-uniformly change (e.g., decrease) as at least a portion or an entirety of the acoustic panel 20 and/or its face skin 30 extend in the longitudinal direction 62; e.g., an axial, downstream direction along the centerline axis 26. This change in the percentage of open area may be based on a mathematic function (e.g., see slope of FIG. 5 or 6); e.g., a non-linear function and/or a non-symmetric function. Examples of the mathematic function include, but are not limited to, a logarithmic function, an exponential function, a power function and a parabolic function. By contrast, if the change in the percentage of open area was based on a linear function, the change may not match and/or approximately follow the changes in the above-soundwave parameters. In other words, if the change in the percentage of open area was based on a linear function, the resulting acoustic panel may either induce more drag than needed and/or not provide enough open area for sound attenuation at various locations along a longitudinal length of that acoustic panel. Thus, because the liner response is highly non-linear, changing the percentage of open area based on a linear function would provide a less effective acoustic panel.

In the embodiment of FIG. 7, the percentage of open area of the face skin 30 is varied by varying sizing (e.g., widths, diameters) of the face skin perforations 40. More particularly, the face skin perforations 40 of FIG. 7 are arranged into one or more longitudinally extending arrays 64. The sizing of commonly situated face skin perforations 40 across some or all of the arrays 64 may be uniform; e.g., constant. However, the sizing of the face skin perforations 40 within the same array 64 is varied. For example, sizes 66 (e.g., widths, diameters) of the face skin perforations 40 in each array 64 may change according to the above mathematical function. Thus, the sizes 66 of the face skin perforations 40 may continuously and/or non-uniformly decrease as the face skin 30/the respective array 64 extends in the longitudinal direction 62 (e.g., the axial, downstream direction). For example, the face skin perforation 40B is longitudinally downstream of the face skin perforation 40A and the size 66B of the face skin perforation 40B is smaller than the size 66A of the face skin perforation 40A. The face skin perforation 40C is longitudinally downstream of the face skin perforation 40B and the size 66C of the face skin perforation 40C is smaller than the size 66B of the face skin perforation 40B, etc. Where inter-perforation distances 68 between the longitudinally neighboring (e.g., adjacent) face skin perforations 40 in each array 64 are maintained uniform (e.g., all of the inter-perforation distances 68 in the same array 64 have a common size), the decrease in the perforation sizes 66 facilitates the decrease in the percentage of open area of the face skin 30. However, in some embodiments, it is contemplated the inter-perforation distances 68 may also be changed (e.g., increased) as the face skin 30/the respective array 64 extends in the longitudinal direction 62. Furthermore, while lateral (e.g., circumferential) spacing between laterally neighboring (e.g., adjacent) arrays 64 in FIG. 7 is uniform (e.g., constant), it is contemplated the lateral spacing may alternatively be varied in other embodiments.

While the percentage of open area decreases in the longitudinal direction 62, the percentage of open area may remain uniform in a lateral (e.g., circumferential) direction 70, which lateral direction 70 of FIG. 7 is perpendicular to the longitudinal direction 62. However, it is contemplated the percentage of open area may also change (e.g., decrease or fluctuate) in the lateral direction, particularly where the fluid flowing along the acoustic panel 20 and its face skin 30 (e.g., through the flowpath 24) has swirl.

Figure 9:
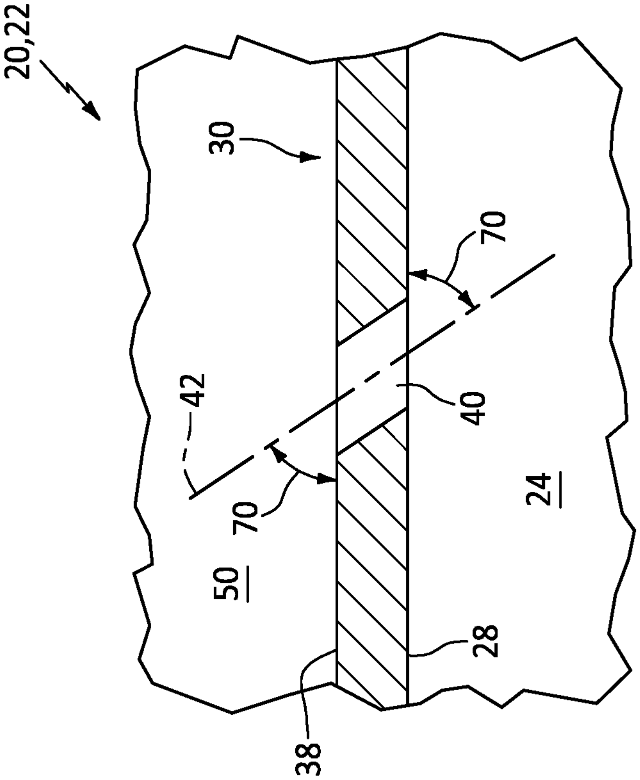
FIGS. 8 and 9 are partial sectional illustrations of the acoustic panel with various face skin perforation arrangements.
Figure 8:
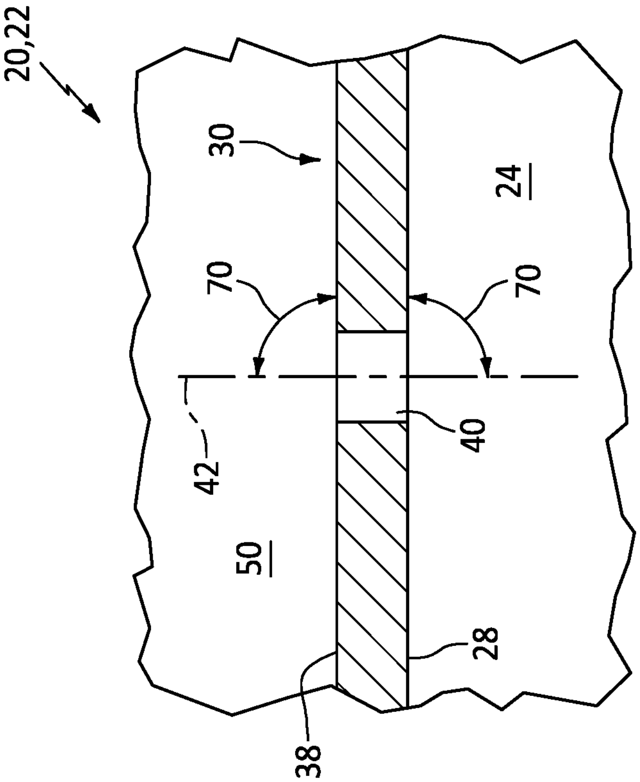
Figure 10A:
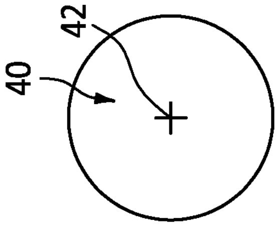
FIGS. 10A-D are schematic illustrations of various face skin perforation cross-sectional geometries.
Figure 10B:
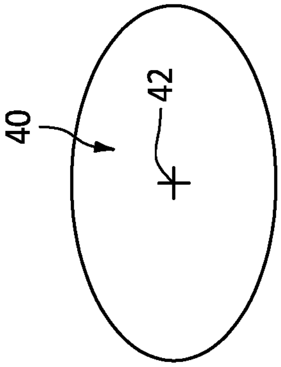
Figure 10C:
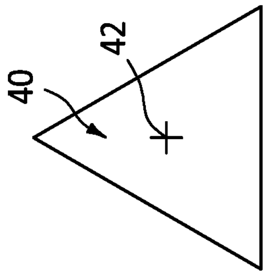
Figure 10D:
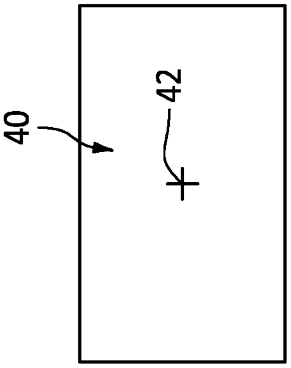

In some embodiments, referring to FIG. 8, the perforation centerline 42 of one or more or all of the face skin perforations 40 may each be arranged perpendicular to the face skin 30 and its sides 28 and 38. In other embodiments, referring to FIG. 9, the perforation centerline 42 of one or more or all of the face skin perforations 40 may each be angularly offset from the face skin 30 and its sides 28 and 38 by a non-zero acute angle. In still other embodiments, an orientation of the perforation centerlines 42 relative to the face skin 30 may change based on the longitudinal and/or lateral location of the face skin perforations 40. For example, angles 70 between the perforation centerlines 42 and the face skin 30 and its sides 28 and 38 may change as the face skin 30 extends in the longitudinal direction 62 (see FIG. 7). This change may be based on the same or a different mathematical function as used for changing the percentage of open area.

Referring to FIGS. 10A-D, each of the face skin perforations 40 has a cross-sectional geometry when viewed in a reference plane. This reference plane may be perpendicular to the perforation centerline 42 and/or parallel with the face skin 30 and its exterior side 28 (see FIG. 1). In some embodiments, referring to FIG. 10A, the cross-sectional geometry may have a circular shape. In other embodiments, referring to FIGS. 10B-D, the cross-sectional geometry may have a non-circular shape; e.g., an elliptical shape (see FIG. 10B), a triangular shape (see FIG. 10C), a rectangular shape (see FIG. 10D), etc. The present disclosure, however, is not limited to the foregoing exemplary perforation geometries.

Figure 11:
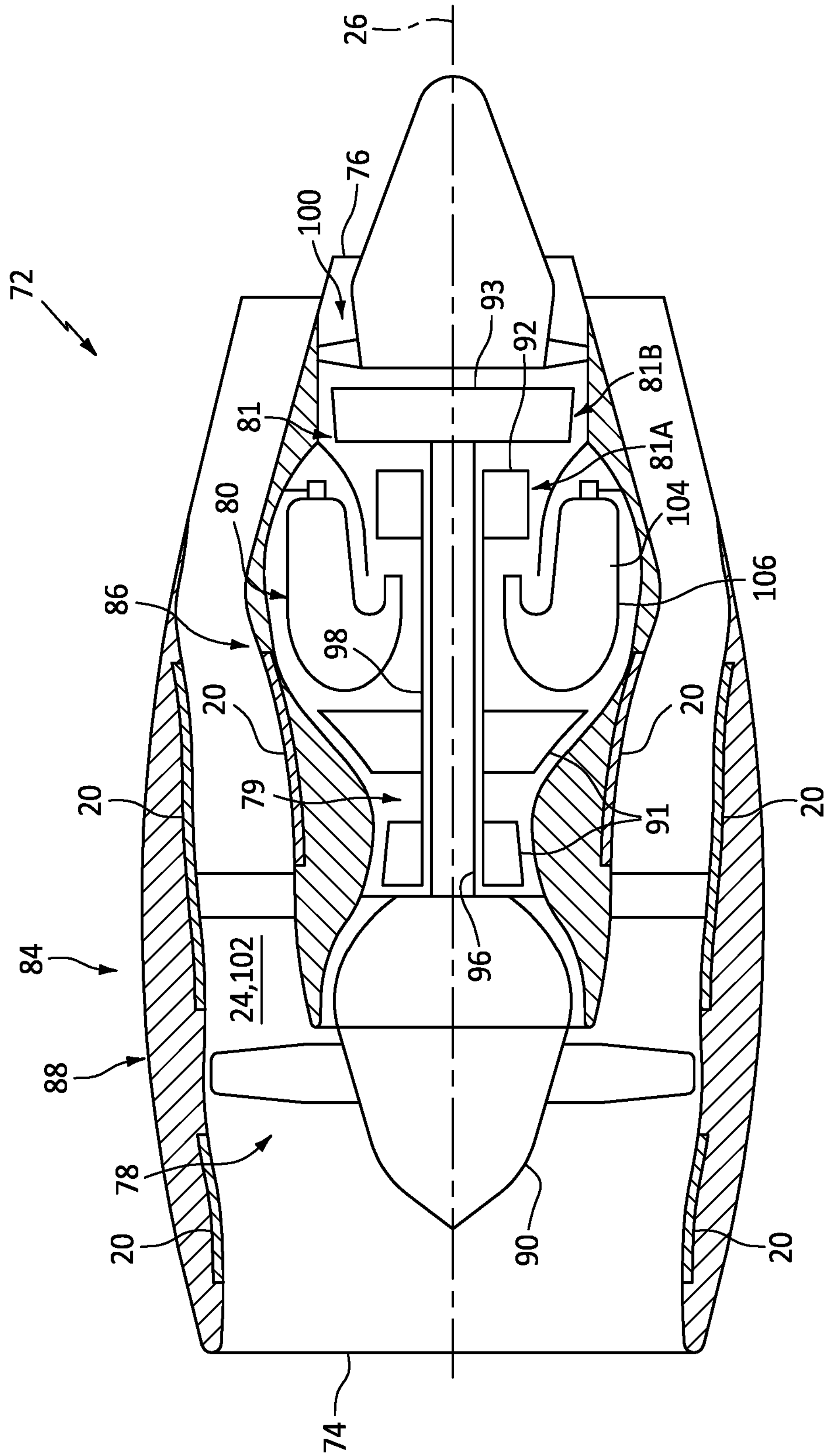
FIG. 11 is a schematic side sectional illustration of an aircraft propulsion system configured with one or more of the acoustic panels.

FIG. 11 illustrates an example of the aircraft propulsion system with which the one or more of the acoustic panels 20 may be configured. This aircraft propulsion system includes a turbofan gas turbine engine 72. The gas turbine engine 72 of FIG. 11 extends axially along the centerline axis 26 between an upstream airflow inlet 74 and a downstream airflow exhaust 76. The gas turbine engine 72 includes a fan section 78, a compressor section 79, a combustor section 80 and a turbine section 81. The turbine section 81 includes a high pressure turbine (HPT) section 81A and a low pressure turbine (LPT) section 81B, which LPT section 81B may also be referred to as a power turbine (PT) section.

The engine sections 78-81B are arranged within the engine housing 84. This engine housing 84 includes an inner housing structure 86 and an outer housing structure 88. The inner housing structure 86 may house one or more of the engine sections 79-81B; e.g., a core of the gas turbine engine 72. The outer housing structure 88 may house at least the fan section 78. The inner and the outer housing structures 86 and 88 of FIG. 11 also form a bypass duct. The inner and/or the outer housing structure 86 and/or 88 may each include one or more of the acoustic panels 20.

Each of the engine sections 78, 79, 81A and 81B includes a respective bladed rotor 90-93. Each of these bladed rotors 90-93 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 90 is connected to and driven by the LPT rotor 93 through a low speed shaft 96. The compressor rotor 91 is connected to and driven by the HPT rotor 92 through a high speed shaft 98. The shafts 96 and 98 are rotatably supported by a plurality of bearings (not shown). Each of these bearings is connected to the engine housing 84 by at least one stationary structure.

During operation, air enters the gas turbine engine 72 through the airflow inlet 74. This air is directed through the fan section 78 and into a core flowpath 100 and a bypass flowpath 102 (e.g., the flowpath 24). The core flowpath 100 extends sequentially through the engine sections 79-81B. The air within the core flowpath 100 may be referred to as “core air”. The bypass flowpath 102 extends through the bypass duct, which bypasses the engine core. The air within the bypass flowpath 102 may be referred to as “bypass air”.

The core air is compressed by the compressor rotor 91 and directed into a combustion chamber 104 of a combustor 106 in the combustor section 80. Fuel is injected into the combustion chamber 104 and mixed with the compressed core air to provide a fuel-air mixture. This fuel air mixture is ignited and combustion products thereof flow through and sequentially cause the HPT rotor 92 and the LPT rotor 93 to rotate. The rotation of the HPT rotor 92 drives rotation of the compressor rotor 91 and, thus, compression of the air received from a core airflow inlet. The rotation of the LPT rotor 93 drives rotation of the fan rotor 90, which propels the bypass air through and out of the bypass flowpath 102. The propulsion of the bypass air may account for a majority of thrust generated by the gas turbine engine 72.

The acoustic panel 20 may be included in various gas turbine engines other than the one described above. The acoustic panel 20, for example, may be included in a geared gas turbine engine where a geartrain connects one or more shafts to one or more rotors in a fan section, a compressor section and/or any other engine section. Alternatively, the acoustic panel 20 may be included in a gas turbine engine configured without a geartrain; e.g., a direct drive gas turbine engine. The acoustic panel 20 may be included in a gas turbine engine configured with a single spool, with two spools (e.g., see FIG. 11), or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU). The present disclosure therefore is not limited to any particular types or configurations of gas turbine engines. Furthermore, while the acoustic panel 20 is described above with respect to various aircraft applications, the acoustic panel 20 of the present application may alternatively be used for non-aircraft applications.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An acoustic panel, comprising:

a first skin comprising an array including a plurality of perforations configured to provide the first skin with a percentage of open area that changes according to a non-linear function as the first skin extends in a first direction, and sizes of at least some of the plurality of perforations varying as the first skin extends in the first direction;

a second skin; and a cellular core arranged between and connected to the first skin and the second skin, the cellular core comprising a plurality of chambers, each of the plurality of chambers extending between the first skin and the second skin, and each of the plurality of chambers fluidly coupled with the array of plurality of perforations, wherein the plurality of perforations extend along respective centerlines through the first skin from a first side of the first skin to a second side of the first skin, and respective angles between the centerlines and the first side of the first skin change based on the non-linear function as the first skin extends in the first direction;

wherein a first of the plurality of chambers is arranged between the first skin and of the second skin;

wherein the first of the plurality of chambers includes a first corrugated sidewall;

wherein a second of the plurality of chambers includes a second corrugated sidewall;

wherein the first of the plurality of chambers and the second of the plurality of chambers are neighboring;

wherein the first corrugated sidewall and the second corrugated sidewall separate the first of the plurality of chambers and the second of the plurality of chambers; and wherein inter-perforation distances between respective neighboring pairs of the at least some of the plurality perforations of the array increase as the array extends in the first direction.

2. The acoustic panel of claim 1, wherein the sizes of the at least some of the plurality of perforations change according to the non-linear function as the array extends in the first direction.

3. The acoustic panel of claim 1, wherein the non-linear function is a logarithmic function.

4. The acoustic panel of claim 1, wherein the non-linear function is a parabolic function.

5. The acoustic panel of claim 1, wherein the non-linear function is a power function.

6. The acoustic panel of claim 1, wherein the non-linear function is an exponential function.

7. The acoustic panel of claim 1, wherein the first skin extends axially along and circumferentially about an axis; and the first direction comprises a component along the axis.

8. The acoustic panel of claim 1, wherein the first direction is a direction of airflow along the first skin during operation of the acoustic panel; and the percentage of open area decreases as the first skin extends in the first direction.

9. The acoustic panel of claim 1, wherein a first of the plurality of perforations has a circular geometry.

10. The acoustic panel of claim 1, wherein a first of the plurality of perforations has a non-circular geometry.

11. The acoustic panel of claim 1, wherein a first of the plurality of perforations extends along a centerline through the first skin; and the centerline is perpendicular to the first side of the first skin.

12. The acoustic panel of claim 1, wherein a first of the plurality of perforations extends along a centerline through the first skin; and the centerline is angularly offset from the first side of the first skin by an acute angle.

13. The acoustic panel of claim 1, wherein the first of the plurality of chambers extends un-interrupted through the cellular core from the second skin to the first skin.

14. The acoustic panel of claim 1, wherein the cellular core comprises a septum dividing the first of the plurality of chambers into a plurality of fluidly coupled sub-chambers.

15. The acoustic panel of claim 1, wherein at least the first skin, the second skin and the cellular core form a component of an aircraft propulsion system.

16. An acoustic panel, comprising:

a first skin comprising a plurality of perforations arranged in an array, wherein widths of the plurality of perforations decrease according to a non-linear function as the array extends in a first direction, and wherein inter-perforation distances between respective neighboring pairs of at least some of the plurality perforations increase as the array extends in the first direction;

a second skin; and a cellular core arranged between and connected to the first skin and the second skin, the cellular core comprising a plurality of chambers, each of the plurality of chambers extending between the first skin and the second skin, and each of the plurality of chambers fluidly coupled with the plurality of perforations;

wherein the plurality of perforations extend along respective centerlines through the first skin from a first side of the first skin to a second side of the first skin, and respective angles between the centerlines and the first side of the first skin change based on the non-linear function as the array extends in the first direction.

17. An acoustic panel, comprising:

a first skin comprising a plurality of perforations, the plurality of perforations configured to provide the first skin with a percentage of open area that varies according to a non-linear function as the first skin extends in a first direction, and inter-perforation distances between respective neighboring pairs of at least some of the plurality perforations increase as the first skin extends in the first direction;

a second skin; and a cellular core arranged between and connected to the first skin and the second skin, the cellular core comprising a plurality of chambers, each of the plurality of chambers extending between the first skin and the second skin, and each of the plurality of chambers fluidly coupled with a respective one or more of the plurality of perforations;

wherein the plurality of perforations extend along respective centerlines through the first skin from a first side of the first skin to a second side of the first skin, and respective angles between the centerlines and the first side of the first skin change based on the non-linear function as the first skin extends in the first direction;

wherein a first of the plurality of chambers is arranged between a first portion of the first skin and a second portion of the second skin;

wherein the first of the plurality of chambers includes a first corrugated sidewall;

wherein a second of the plurality of chambers includes a second corrugated sidewall;

wherein the first of the plurality of chambers and the second of the plurality of chambers are neighboring; and wherein the first corrugated sidewall and the second corrugated sidewall separate the first of the plurality of chambers and the second of the plurality of chambers.

* * * * *